United States Patent Office 3,506,903
Patented Apr. 14, 1970

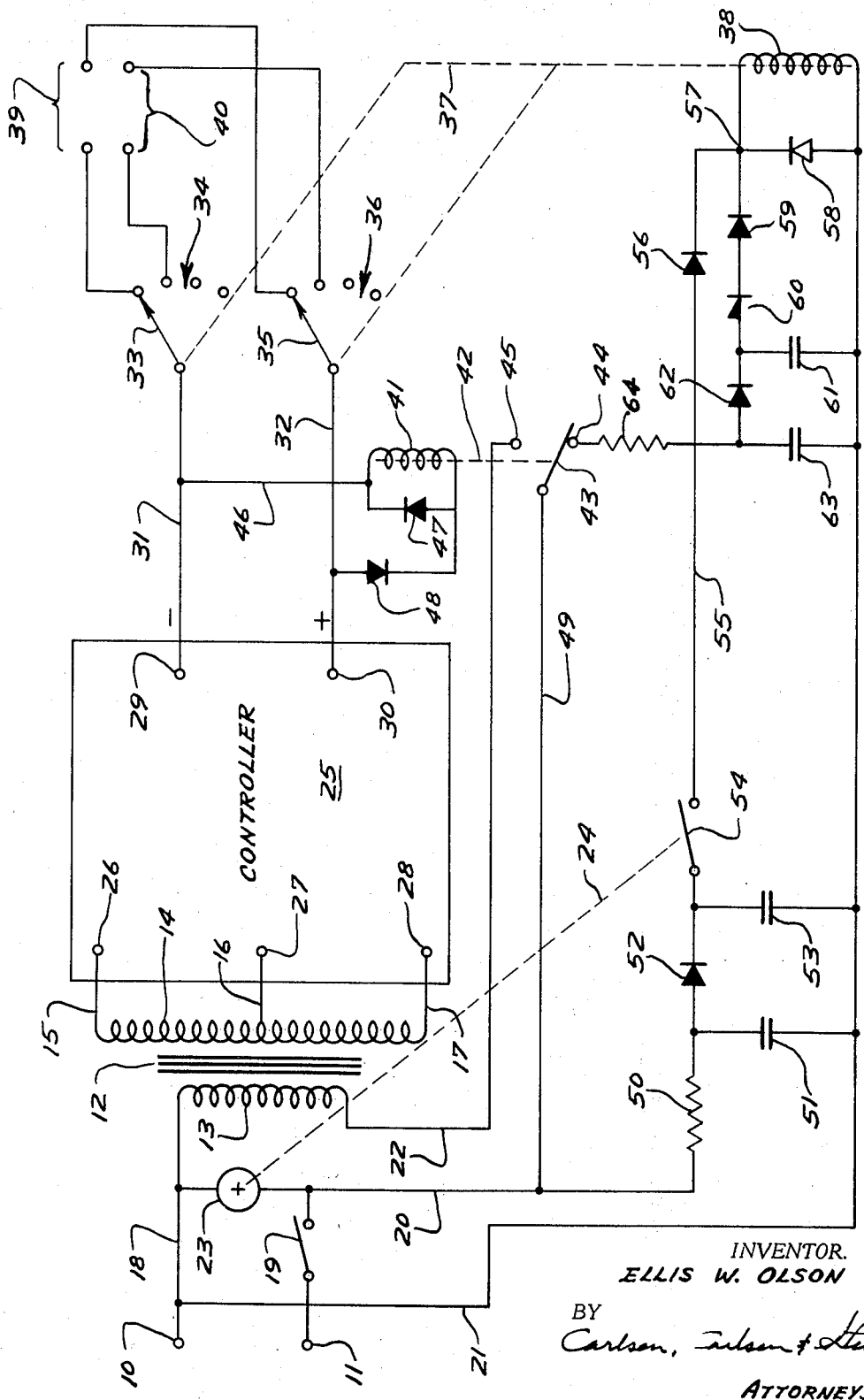

3,506,903
AUTOMATIC CHARGING APPARATUS
Ellis W. Olson, Hopkins, Minn., assignor to Introl Corporation, Minneapolis, Minn., a corporation of Minnesota
Filed Aug. 17, 1967, Ser. No. 661,271
Int. Cl. H01m 45/04
U.S. Cl. 320—17                                  7 Claims

ABSTRACT OF THE DISCLOSURE

Automatic charging apparatus in which a plurality of batteries may be accommodated for automatic sequential charging, conditioning or maintaining. A timed selective switching apparatus is utilized to sequentially select pairs of output terminals that are connected or intended to be connected to batteries to be charged. A periodic signal from the timed source causes sequential operation of the selective switching apparatus. Further apparatus is provided for de-energizing a source of charging potential in the absence of a battery, or the like, across any particular pair of output terminals or, in the alternative, the possible connection of a battery in a polarity reverse of that for which the apparatus is designed to operate. In the situation wherein there is no battery present or the polarity is incorrect, this appartus causes continued sequential operation of the selective switching apparatus until terminals are found having a battery connected in the proper polarity. The charge controller is then energized and the particular battery will be charged according to the characteristics of the controller until such time as the end of the period of the timer device.

---

This invention relates generally to automatic charging apparatus and is more particularly directed to apparatus for automatically and sequentially charging batteries that happen to be connected to corresponding pairs of a plurality of pairs of output terminals.

In the prior art apparatus to which my invention pertains, sequential battery charging systems have been developed in which a plurality of corresponding pairs of output terminals are sequentially energized in a timed relationship and the apparatus has been operative regardless of whether or not a battery is connected to a pair of corresponding terminals and regardless of whether or not a battery is connected in the proper polarity for accepting a charging potential.

As will be seen from the detailed description of my invention set forth below, my invention provides apparatus that will modify a timed sequence of operation provided by an interval timer in accordance with the condition appearing at any particular pair or pairs of corresponding output terminals with the result that if, for instance, there is no battery connected to a pair of output terminals, a selective switching means may be operable to proceed to the next sequential pair of output terminals without requiring the usual long wait between timed intervals provided by the primary timing apparatus. Further, by invention provides the same feature of proceeding to the next sequential pair of corresponding output terminals in the event the battery is improperly connected to the output terminals to prevent possible damage to the battery or the charge controller apparatus with a resultant gain in efficiency of operation both from a standpoint of time and material. The apparatus is fully automatic and does not require the use of an attendant to monitor its operation.

It is therefore an object of my invention to provide an improved automatic charging apparatus.

It is another object of my invention to provide improved automatic charging apparatus which attains increased efficiency of operation.

Another object of my invention is to provide improved automatic charging apparatus which attains increased efficiency of operation.

Another object of my invention is to provide improved automatic charging apparatus which provides a timed sequence of charging periods only to corresponding pairs of a plurality of output electrodes which have devices to be charged properly connected thereto.

These and other objects of my invention will become apparent from a consideration of the appended specificcation, claims and drawing, which in schematic and diagrammatic form, shows an automatic charging apparatus embodying the principles of my invention.

Referring now the drawing, there is shown a pair of input terminals 10 and 11 adapted to be connected to a suitable source of alternating current. A transformer 12 having a primary winding 13 and a center-tapped secondary winding 14 is shown operatively disposed intermediate input terminals 10 and 11 and input terminals 26, 27 and 28 on a controller 25 which may be, for example, battery charging apparatus sold by the Introl Corporation of Minneapolis, Minn., and identified by model PSA 65. Primary winding 13 is shown having its upper extremities connected to input terminal 10 through conductor 18 and its lower extremity connected to input terminal 11 through conuctor 22, stationary contract 45, movable contact 43, conductor 49, conductor 20 and single-pole single-throw siwtch 19. A timer motor 23 is shown connected intermediate conductors 18 and 20.

Controller 25 is shown having its input terminals 26 and 28 connected to the top and lower extremities of secondary winding 14 through conductors 15 and 17 respectively. Input terminal 27 of controller 25 is connected to the center of secondary winding 14 through conductor 16.

The output terminals 29 and 30 on controller 25 are connected to movable wipers 33 and 35 on selector switch assemblies 34 and 36 through conductors 31 and 32 respectively. Selector switches 34 and 36 also include a plurality of corresponding stationary contacts that are connected in the manner shown to provide a like plurality of pairs of output terminals 39 and 40 which are adapted to be connected to, for example, batteries to be charged or maintained. Movable wipers 33 and 35 are adapted to be simultaneously rotated in a predetermined manner to provide the proper relationship for the corresponding pairs of output terminals through driving means 37 that is operatively associated with relay winding 38 in a manner as used, for example, on the telephone-type stepping relays that are familiar to those skilled in the art.

A polarity sensitive, potential responsive relay winding 41 is shown connected to conductor 31 through conductor 46 and to conductor 32 through asymmetrical current conducting device 48. A further asymmetrical current conducting device 47 is connected in parallel with relay winding 41. Relay winding 41 is operatively associated with a suitable driving means 42 that is operative to actuate movable contact 43 intermediate stationary contacts 44 and 45.

The lower extremity of relay winding 38 is connected to conductor 21, in turn connected to input terminal 10. Relay winding 38 may be energized through a circuit including conductor 20, resistor 50, asymmetrical current conducting device 52, normally open single-pole single-throw switch means 54, conductor 55 and asymmetrical current conducting device 56 connected to terminal 57. Relay winding 38 may also be energized from conductor 20 through conductor 49, movable switch contact 43, stationary switch contact 44, resistor 64, asymmetrical current conducting device 62, Skockley-type diode 60, asymmetrical current conducting device 59 connected to terminal 57. Suitable filtering capacitors 51 and 63 are shown connected intermediate resistor 50 and conductor 21 and resistor 64 and conductor 21 respectively. Energy storage capacitors 53 and 61 are further shown connected intermediate the right extremity of asymmetrical current conducting devices 52 and 62 and conductor 21 respectively.

The following is a table of values of components that were utilized in a successfully operated apparatus utilizing the principles of my invention:

| Reference character: | Component, name and value |
|---|---|
| 23 | 2-hour interval timer. |
| 48 | Silicon diode 50 v. 1 amp. |
| 52 | Do. |
| 56 | Do. |
| 59 | Do. |
| 58 | Do. |
| 47 | Silicon diode 50 v. 1 amp. |
| 62 | Do. |
| 60 | Shockley diode type 4E50. |
| 50 | 33K ohm resistor. |
| 64 | 24K ohm resistor. |
| 51 | .1 microfarad capacitor. |
| 63 | .1 microfarad capacitor. |
| 53 | 50 microfarad capacitor. |
| 61 | 250 microfarad capacitor. |
| 25 | Introl Corporation type PSA–100 charge controller. |

OPERATION

Assuming that batteries to be charged have been connected with proper polarity across corresponding pairs of output terminals, e.g. pairs 39 and 40, input terminals 10 and 11 may be energized from a suitable source of alternating current (not shown). Switch 14 is closed to initiate the operation of timing motor 23 and assuming that contacts 54 are in the open state shown in the drawing and the timer is at the beginning of a two-hour cycle, relay winding 41 will become energized to position movable contact 43 in conductive relationship with stationary contact 45 to complete a circuit to primary winding 13 on transformer 12 to thus energize secondary winding 14 and controller 25. Controller 25, which may be of many forms operative to produce a direct current output of predetermined characteristic and in the polarity shown, is then energized to supply current across output terminals 29 and 30 in a circuit including conductor 31, movable contact 33, the upper contact of stationary contacts 34, output terminal pair 39, the upper contact of stationary contacts 36, movable wiper 35 and conductor 32 and a battery connected to contact pair 39 will be charged for a predetermined time dependent upon the characteristics of timer 23.

At the end of a timing cycle, timer 23 is operative to momentarily close switch 54 which is operative to supply a charge that has accumulated across capacitor 53 to stepping switch winding 38 through conductor 55, asymmetrical current conducting device 56 and terminal 57 connected to stepping switch winding 38. Upon energization of stepping switch winding 38 wipers 33 and 35 will be stepped clockwise to the next contact in stationary contact assemblies 34 and 36 to connect output terminal pair 40 to conductors 31 and 32. At this time, if a battery is properly connected to contact pair 40, relay winding 41 will be energized as noted above and the operation will continue as described above.

In the event there is no battery connected across output terminal pair 40, relay winding 41 will remain de-energized and movable contact 43 associated therewith will conductively engage stationary contact 44 to connect capacitor 61 to conductor 20 through asymmetrical current conducting device 62, resistor 64, stationary contact 44, movable contact 43 and conductor 49. A charge will gradually accumulate across capacitor 61 and when the potential exceeds the breakdown potential of Shockley diode 60, the capacitor will be discharged through Shockley diode 60, asymmetrical current conducting device 59 and terminal 57 to stepping switch winding 38 to cause movable wipers 33 and 35 to move to the next succeeding, corresponding pair of stationary contacts 34 and 36. The same operation will prevail, successively stepping movable wipers 33 and 35 in a predetermined timed relationship until movable wipers 33 and 35 engage a pair of stationary contact 34 and 36 which are connected to a pair of output terminals having a battery connected in proper polarity for charging.

In the event a battery is disposed across a pair of output terminals with improper polarity, relay winding 41 will remain de-energized and the operation of continuously stepping movable wipers 33 and 35 will continue as if there were no battery connected to those terminals. Thus, the timing cycle determined by timer 23 may be modified in accordance with conditions sensed at the output terminals and further chrage controller 25 will remain de-energized until a pair of output terminals having a battery connected in proper polarity, is connected in circuit with conductors 31 and 32 thereby preventing damage to improperly connected batteries and vastly increasing the duty cycle and efficiency of the apparatus.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Charging apparatus comprising in combination; a pair of input terminals adapted to be connected to a source of electrical energy; a plurality of pairs of output terminals adapted to be connected to a like plurality of batteries to be charged; charge controlling means having input and output terminals; switching means operable to sequentially connect said plurality of pairs of output terminals to the output teminals on said charge controlling means; a source of signal having a low frequency, connected to said switching means to periodically actuate said switching means; and potential responsive switching means connected to the output terminals of said charge controlling means, said last named switching means being operable to actuate the first named switching means at a high frequency in the absence of a potential of predetermined characteristic, to connect the input terminals on said charge controlling means to said pair of input terminals.

2. The apparatus of claim 1 in which the low frequency source of signal includes a motor means connected to the pair of input terminals and is connected to the first named switching means through circuit means including asymmetrical current conducting means.

3. The apparatus of claim 1 in which the potential responsive switching means is connected to the first named switching means through circuit means including asymmetrical current conducting means.

4. The apparatus of claim 1 in which the low frequency source of signal includes a motor means connected to the pair of input terminals and is connected to the first named switching means through circuit means including asymmetrical current conducting means.

5. The apparatus of claim 3 in which the low frequency source of signal includes a motor means connected to the pair of input terminals and is connected to the first named switching means through circuit means including asymmetrical current conducting means.

6. The apparatus of claim 3 in which the circuit means further includes capacitive energy storage means and potential responsive current controlling means adapted to energize the first named switching means whenever the potential across said capacitive energy storage means exceeds a predetermined value.

7. The apparatus of claim 6 in which the low frequency source of signal includes a motor means connected to the pair of input terminals and is connected to the first named switching means through circuit means including asymmetrical current conducting means.

References Cited

UNITED STATES PATENTS

| | | | |
|---|---|---|---|
| 2,496,859 | 2/1950 | Dalzell | 320—19 |
| 2,977,525 | 3/1961 | Medlar | 320—19 |
| 3,215,922 | 11/1965 | Olsen et al. | 320—40 |
| 3,217,225 | 11/1965 | Gottlieb et al. | 320—48 X |
| 3,278,824 | 10/1966 | Runyon | 320—48 X |
| 3,305,754 | 2/1967 | Oates et al. | 320—40 X |
| 3,413,536 | 11/1968 | Webb | 320—40 X |

LEE T. HIX, Primary Examiner

S. WEINBERG, Assistant Examiner

U.S. Cl. X.R.

320—19, 25, 31